(12) United States Patent
Dahlman

(10) Patent No.: US 12,166,764 B2
(45) Date of Patent: Dec. 10, 2024

(54) METHOD AND SYSTEM FOR CREATING SOCIAL MEDIA CONTENT COLLECTIONS

(71) Applicant: Lemon Inc., Grand Cayman (KY)

(72) Inventor: Dustin Dahlman, Culver City, CA (US)

(73) Assignee: LEMON INC., Grand Cayman (KY)

(*) Notice: Subject to any disclaimer, the term of this patent is extended or adjusted under 35 U.S.C. 154(b) by 253 days.

(21) Appl. No.: 17/831,176

(22) Filed: Jun. 2, 2022

(65) Prior Publication Data

US 2023/0396621 A1     Dec. 7, 2023

(51) Int. Cl.
*H04L 9/40* (2022.01)
*G06F 9/451* (2018.01)
*G06Q 50/00* (2024.01)

(52) U.S. Cl.
CPC .......... *H04L 63/101* (2013.01); *G06F 9/451* (2018.02); *G06Q 50/01* (2013.01)

(58) Field of Classification Search
CPC ........ H04L 63/101; G06F 9/451; G06Q 50/01
See application file for complete search history.

(56) References Cited

U.S. PATENT DOCUMENTS

| | | | |
|---|---|---|---|
| 9,773,228 B2* | 9/2017 | Baldwin | .............. H04L 67/306 |
| 2010/0058182 A1 | 3/2010 | Jung | |
| 2014/0195516 A1 | 7/2014 | Balakrishnan et al. | |
| 2014/0365581 A1* | 12/2014 | Kennon | ............. G06Q 30/0277 |
| | | | 709/205 |
| 2015/0331856 A1* | 11/2015 | Choi | ..................... G06Q 50/01 |
| | | | 707/746 |
| 2015/0382167 A1 | 12/2015 | Padmanabhan et al. | |
| 2020/0372196 A1* | 11/2020 | Bhowmick | ........... G06F 30/333 |
| 2021/0406040 A1* | 12/2021 | Kuduvalli | ............... G06F 9/451 |

FOREIGN PATENT DOCUMENTS

| | | |
|---|---|---|
| GB | 2519312 A | 4/2015 |
| WO | 2017096466 A1 | 6/2017 |

OTHER PUBLICATIONS

International Search Report in PCT/SG2023/050359, mailed Dec. 21, 2023, 4 pages.

* cited by examiner

*Primary Examiner* — Sm A Rahman
(74) *Attorney, Agent, or Firm* — Astute IP Law Group

(57) ABSTRACT

Example aspects include techniques for implementing social media content collections. These techniques may include generating a social media content collection (SMCC) within a social media network, and assigning an administrator privilege for the SMCC to an account, the administrator privilege granting the account one or more access rights. In addition, the techniques may include generating a collection representation via a graphical user interface (GUI) wizard, and setting the collection representation as a collection thumbnail representation of the SMCC. Further, the techniques may include adding, based on the one or more access rights, one or more video content items to the SMCC, in response to selection of a GUI control in a presentation mode of the one or more content items, and reproducing, in response to selection of the SMCC, the one or more video content items in a continuous playback mode.

26 Claims, 6 Drawing Sheets

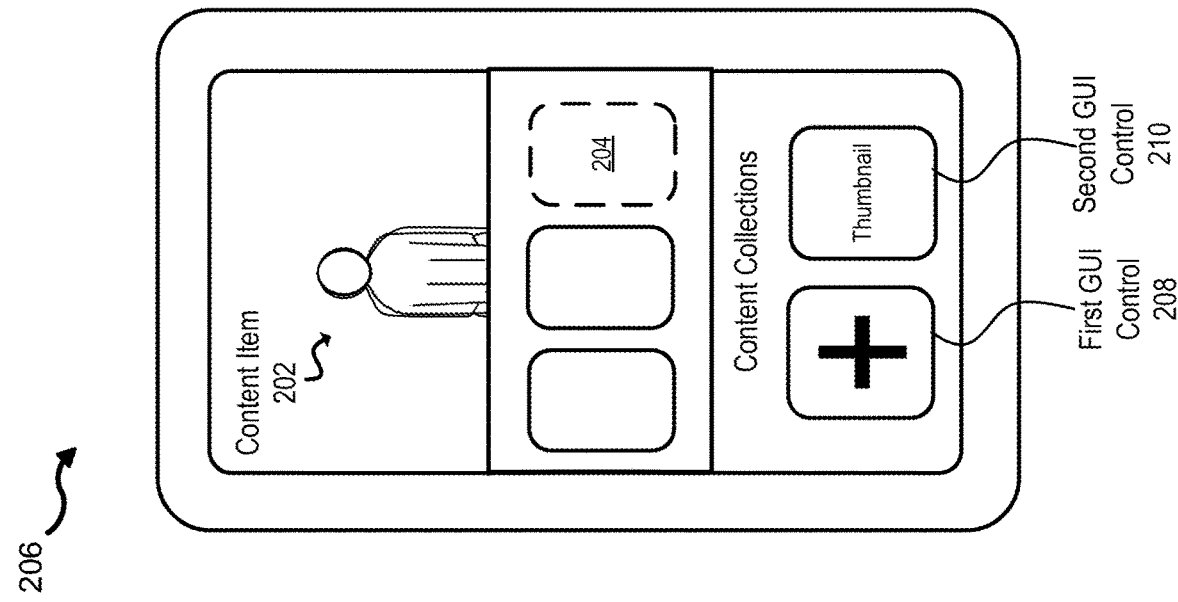
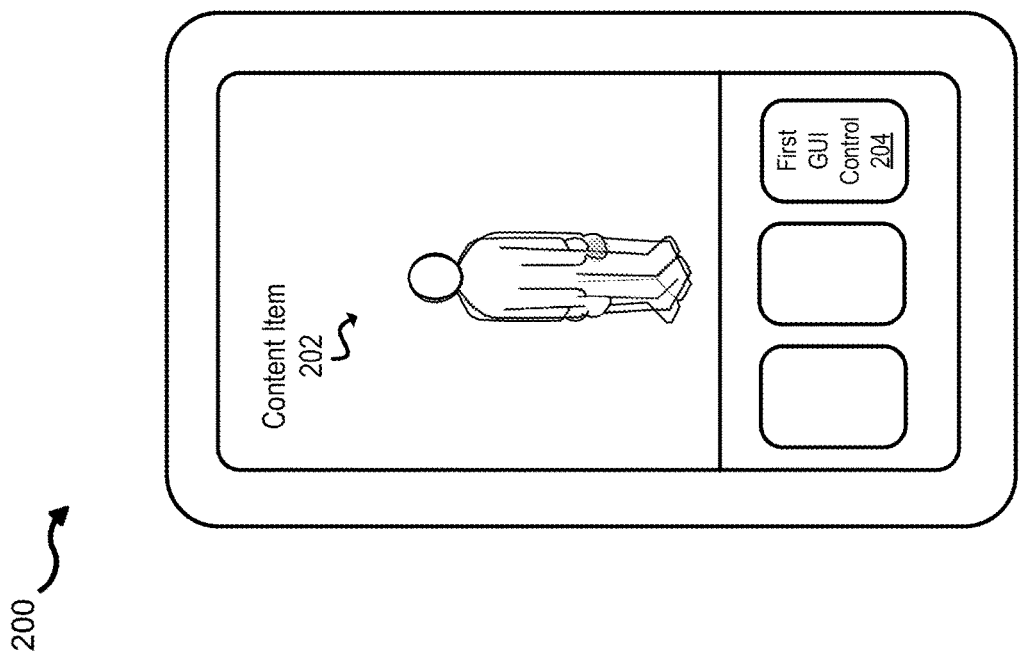
FIG. 2A

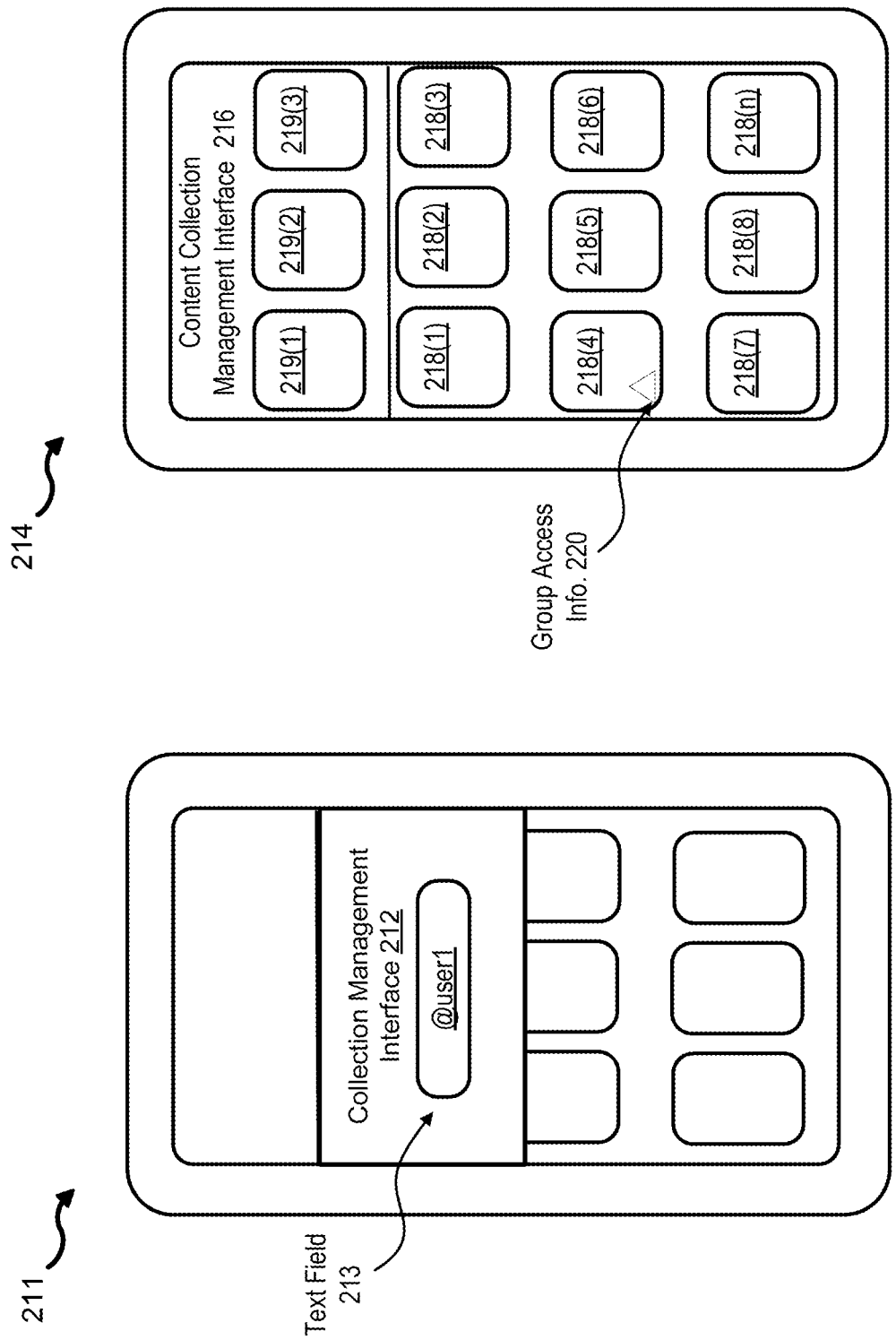

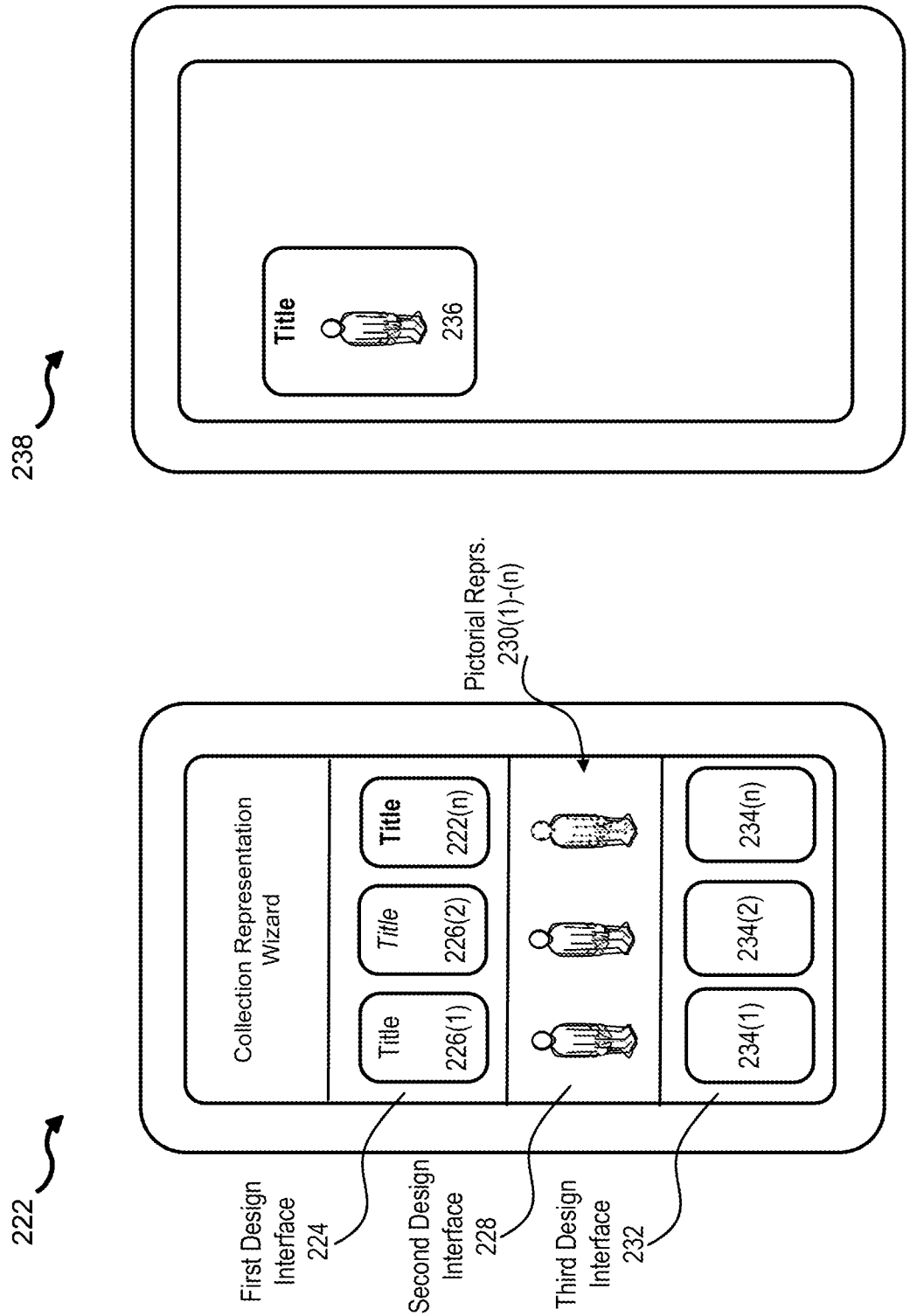

300

```
┌─────────────────────────────────────────────────────────────┐
│   GENERATING A SOCIAL MEDIA CONTENT COLLECTION (SMCC) WITHIN A │
│              SOCIAL MEDIA PLATFORM                          │
│                         302                                  │
└─────────────────────────────────────────────────────────────┘
                            │
                            ▼
┌─────────────────────────────────────────────────────────────┐
│  ASSIGNING AN OWNERSHIP PRIVILEGE FOR THE SMCC TO AN ACCOUNT ON │
│  THE SOCIAL MEDIA PLATFORM, THE OWNERSHIP PRIVILEGE GRANTING THE │
│         ACCOUNT ONE OR MORE ACCESS RIGHTS                   │
│                         304                                  │
└─────────────────────────────────────────────────────────────┘
                            │
                            ▼
┌─────────────────────────────────────────────────────────────┐
│  GENERATING A COLLECTION REPRESENTATION VIA A GRAPHICAL USER │
│    INTERFACE (GUI) WIZARD ON THE SOCIAL MEDIA PLATFORM       │
│                         306                                  │
└─────────────────────────────────────────────────────────────┘
                            │
                            ▼
┌─────────────────────────────────────────────────────────────┐
│    SETTING THE COLLECTION REPRESENTATION AS A COLLECTION     │
│  THUMBNAIL REPRESENTATION OF THE SMCC ON THE SOCIAL MEDIA    │
│                       PLATFORM                              │
│                         308                                  │
└─────────────────────────────────────────────────────────────┘
                            │
                            ▼
┌─────────────────────────────────────────────────────────────┐
│  ADDING, BASED ON THE ONE OR MORE ACCESS RIGHTS, ONE OR MORE │
│  VIDEO CONTENT ITEMS TO THE SMCC, IN RESPONSE TO SELECTION OF A │
│  GUI CONTROL IN A PRESENTATION MODE OF THE ONE OR MORE CONTENT │
│                         ITEMS                               │
│                         310                                  │
└─────────────────────────────────────────────────────────────┘
                            │
                            ▼
┌─────────────────────────────────────────────────────────────┐
│  REPRODUCING, IN RESPONSE TO SELECTION OF THE SMCC, THE ONE OR │
│   MORE VIDEO CONTENT ITEMS IN A CONTINUOUS PLAYBACK MODE     │
│                         312                                  │
└─────────────────────────────────────────────────────────────┘
```

*FIG. 3*

METHOD AND SYSTEM FOR CREATING SOCIAL MEDIA CONTENT COLLECTIONS

BACKGROUND

Many content consumers employ social media networks to view content, e.g., video content. Further, in some instances, users may prefer to save and organize video content consumed on a social media network. For example, a user may view a viral video on a social media network and endeavor to save the video for later viewing. However, many social media applications fail to offer user-friendly techniques for saving network content. For example, many social media apps save video content to a native photograph application of a mobile device where it may be difficult for users to find and/or organize video content saved from a social media network. In addition, users may also lack user friendly techniques for sharing video content once it is saved to a user device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method including: generating a social media content collection (SMCC) within a social media network; assigning an administrator privilege for the SMCC to an account on the social media network, the administrator privilege granting the account one or more access rights; generating a collection representation via a graphical user interface (GUI) wizard on the social media network; setting the collection representation as a collection thumbnail representation of the SMCC on the social media network; adding, based on the one or more access rights, one or more video content items to the SMCC, in response to selection of a GUI control in a presentation mode of the one or more content items; and reproducing, in response to selection of the SMCC, the one or more video content items in a continuous playback mode.

In some aspects, the techniques described herein relate to a non-transitory computer-readable device having instructions thereon that, when executed by at least one computing device, causes the at least one computing device to perform operations including: generating a social media content collection (SMCC) within a social media network; assigning an administrator privilege for the SMCC to an account on the social media network, the administrator privilege granting the account one or more access rights; generating a collection representation via a graphical user interface (GUI) wizard on the social media network; setting the collection representation as a collection thumbnail representation of the SMCC on the social media network; adding, based on the one or more access rights, one or more video content items to the SMCC, in response to selection of a GUI control in a presentation mode of the one or more content items; and reproducing, in response to selection of the SMCC, the one or more video content items in a continuous playback mode.

In some aspects, the techniques described herein relate to a system including: a memory storing instructions thereon; and at least one processor coupled with the memory and configured by the instructions to: generate a social media content collection (SMCC) within a social media network; assign an administrator privilege for the SMCC to an account on the social media network, the administrator privilege granting the account one or more access rights; generate a collection representation via a graphical user interface (GUI) wizard on the social media network; set the collection representation as a collection thumbnail representation of the SMCC on the social media network; add, based on the one or more access rights, one or more video content items to the SMCC, in response to selection of a GUI control in a presentation mode of the one or more content items; and reproduce, in response to selection of the SMCC, the one or more video content items in a continuous playback mode.

In another aspect, an example computer-readable medium (e.g., non-transitory computer-readable medium) storing instructions for performing the methods described herein, an example system or device configured to perform operations of the methods described herein, and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 2A illustrates an example graphical user interface for creating social media content collections, in accordance with some aspects of the present disclosure.

FIG. 2B illustrates an example graphical user interface for managing access to a content collection, in accordance with some aspects of the present disclosure.

FIG. 2C illustrates an example graphical user interface for managing and viewing a content collection, in accordance with some aspects of the present disclosure.

FIG. 2D illustrates example graphical user interfaces for creating a collection representation, in accordance with some aspects of the present disclosure.

FIG. 3 is a flow diagram illustrating an example method for managing social media content collections, in accordance with some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for creating social media content collections. Aspects of the present disclosure provide integrated content collections within a social media environment. In particular, aspects of the present disclosure create content collections including content items, create customized collection representations for the content collections, and manage access to the content collections via a social media network. As a result, the present disclosure may be used to store, organize, and share social media content items within a social media application in a more user-friendly way when compared to less organized and integrated media storage applications provided by device operating systems.

Illustrative Environment

Figure 1:
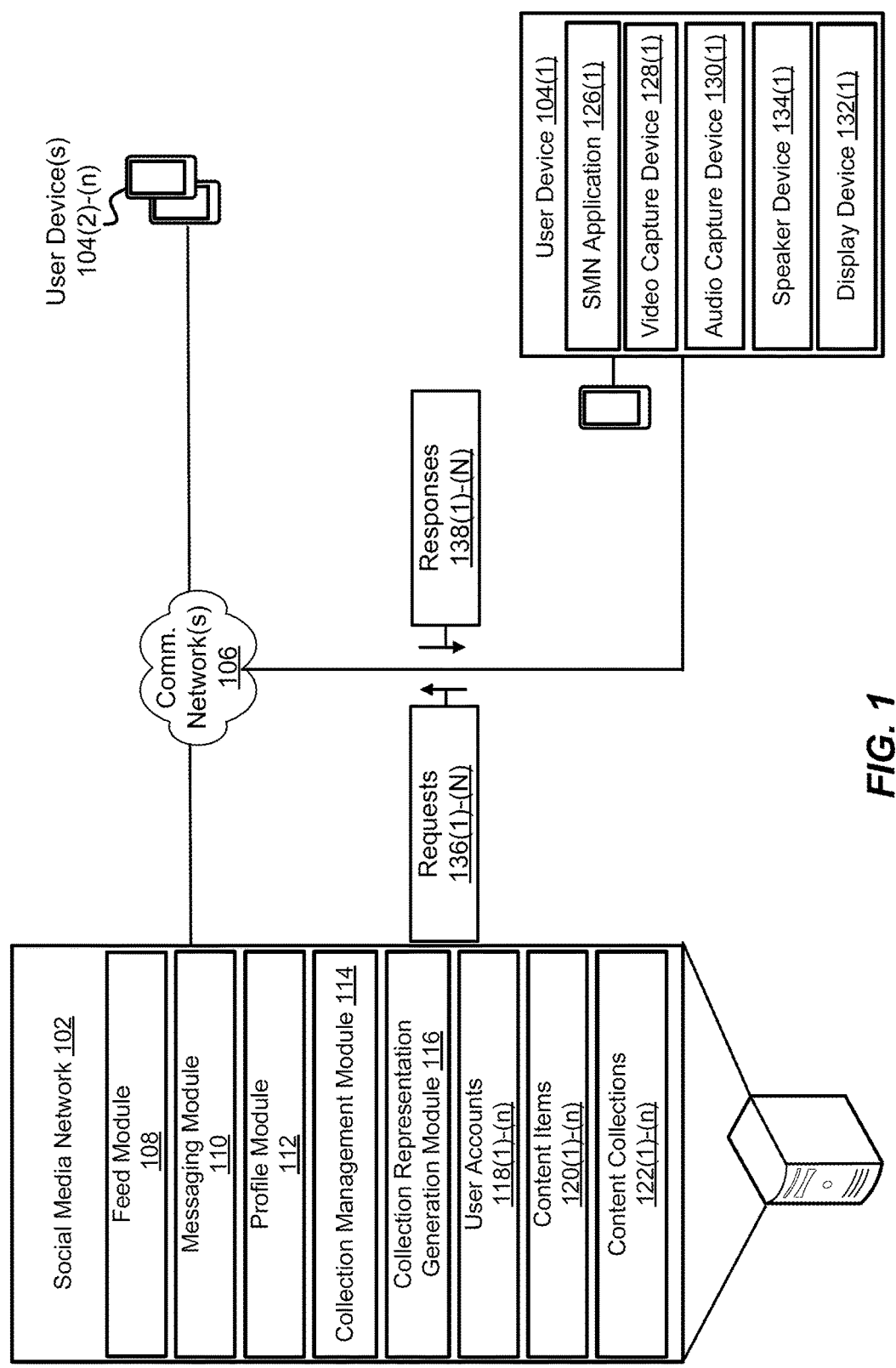
FIG. 1 illustrates an example architecture of a social media environment, in accordance with some aspects of the present disclosure.

FIG. 1 illustrates an example architecture of a social media environment (SME) 100, in accordance with some aspects of the present disclosure. As illustrated in FIG. 1, the SME 100 may include a social media network (SMN) 102 and a plurality of user devices 104(1)-(n) that can communicate with one another via one or more wired and/or wireless communication networks 106(1)-(n). Some examples of a user device 104 include a cellular phone, a smartphone, a tablet, a wearable device, a desktop computer, a workstation computer, a virtual machine, etc. In some implementations, the communication network(s) 106 may include one or any combination of a radio network, a cellular network, and one or more of a wired and/or wireless private network, personal area network, local area network, wide area network, and/or the Internet.

The SMN 102 may be configured to provide an online platform for facilitating interaction between users of the online platform. Further, in some aspects, a user of the online platform may create and share multimedia content (e.g., video content) via the online platform. In some aspects, the SMN 102 may include a feed module 108 configured to generate and display user feeds to a plurality of user accounts 118(1)-(n). For instance, a user account 118 may include, but is not limited to, a registered identity created for a user within a social media network. Also, as used herein, in some aspects, a "feed" may refer to a collection of content items displayed within a graphical user interface. For example, the feed module 108 may generate and manage a first feed for a first user account 118(1), a second feed for a second account 118(2), a nth feed for a nth user account 118(n), and so forth. Further, each feed may be personalized based upon user information collected about the corresponding user account 118. For example, the first user feed may be populated with content items 120 determined to be of interest to a user within an age range associated with the first user account 118(1). For instance, a content item 120 may include, but is not limited to, digital media including at least one of video, images, audio, and/or text. Further, in some aspects, the content items in a feed may be presented in a continuous playback mode (e.g., autoplay).

In some aspects, the SMN 102 may include a messaging module 110 configured to manage direct messaging and group messaging between the user accounts 118(1)-(n). For example, the messaging module 110 may be configured to manage receipt of a message from a first account 118(1), transmission of the message to a second account 118(2), and presentation of the message to the second account 118(2). In addition, the messaging module 110 may be configured to manage editing and deletion of messages that has been transmitted between user accounts 118(1)-(2). As another example, the messaging module 110 may be configured to manage receipt of a message from a first account 118(1), transmission of the message to a second account 118(2) and a third account 118(3), and presentation of the message to the second account 118(2) and the third account 118(3).

In some aspects, the SMN 102 may include a profile module 112 configured to manage user profiles of the user accounts 118(1)-(n). For example, the profile module 112 may be configured to create, edit, delete and/or display user profiles of the user account 118(1). In some aspects, each user account 118 may have a user profile that includes one or more user-provided attributes (e.g., name, location, etc.). Further, a user profile may have a navigable address within the SMN 102. As such, other users may navigate to the address of a user profile within the SMN 102, and the profile module 112 may display the profile to the other users.

In some aspects, the SMN 102 may include a collection management module 114 configured to manage the plurality of content collections 122(1)-(n). For instance, a content collection 122 may include, but is not limited to, one or more user selected content items grouped together on the social media network and accessible for consumption as a unit within a social media application. For example, the collection management module 114 may be configured to create, delete, and/or edit the plurality of content collections 122(1)-(n). For example, the collection management module 114 may be configured to add content items 120 selected by one or more user accounts to a content collection 122(1). Further, the collection management module 114 may be configured to manage access to the content collections 122(1)-(n) by the user accounts 118(1)-(n). For example, the collection management module 114 may create, delete, and/or edit the access rights of the user accounts 118(1)-(n) with respect to the content collections 122 based on user input from user accounts 118 having administrator privileges.

For example, in some aspects, the collection management module 114 may grant administrator privileges to the user account 118(1) that creates a content collection 122. Further, the user account 118(1) may configure the content collection 122 as a private collection that may only be accessible to the user account 118(1) that created the content collection 122, a group-accessible collection accessible to two or more user accounts 118 specified by the user account 118(1) that created the content collection 122, or a publicly-accessible collection accessible to user accounts 118 on the SMN 102 via the collection management module 114. In addition, the user account 118(1) may configure the content collection 122 to be accessible to the user accounts 118 of profiles that the user account 118(1) is subscribed to and/or the user accounts 118 of the profiles that subscribe to the profile of the user account 118(1). Further, the user account 118(1) may set whether the user accounts 118 that have been provided access to the content collection 122 can view the content items 120 within the content collection 122 or view and edit the content items 120 within the content collection 122.

In addition, in some aspects, the collection management module 114 may be configured to generate a content file for a content collection 122. For example, the collection management module 114 may combine the content items 120 of a content collection 122 into a single content file. In some aspects, the single content file may be a mp4 file or other video filetype. Further, the user account 118 that requests generation of the content file may determine the sequence of the content items 120 within the content file.

In some aspects, the SMN 102 may include a collection representation generation module 116 configured to generate collection representations 124(1)-(n) for the content collections 122(1)-(n). For instance, collection representations 124(1)-(n) include any type of graphic, alphabetic, and/or numeric design element configured to indicate a respective content collection 122. In particular, the collection representation generation module 116 may be configured to present a graphical user interface (GUI) wizard to the client devices 104(1)-(n). The GUI wizard may receive user input and generate the collection representations based on the user input. In some aspects, the user input may include selection of one or more design elements via the GUI wizard. Some examples of the design elements include textual information, a foreground images and objects, background images, and/or an animation effects. For example, a user account 118(1) may provide textual input to be displayed as a title of the content collection, select a personalized pictorial representation and add virtual clothes to the personalized pictorial representation, and select one or more animations to apply to the textual input and/or the personalized pictorial representation via the GUI wizard. Further, the collection representation generation module 116 may generate an image file displaying the title, personalized pictorial representation with virtual clothes, and animation effects based on the user input. In addition, the collection management module 114 may use the image file generated by the collection representation generation module 116 as the collection thumbnail representation for the content collection 122. Additionally, the feed module 108 and the messaging module 110 may be configured to display the collection thumbnail representation of a content collection when presenting the content collection to a user account.

As illustrated in FIG. 1, a user device 104 may include a SMN application 126 for interacting with the various components of the SMN 102 as well as other associated components on the user device 104 such as a video capture device 128 configured to capture image and video data, an audio capture device 130 configured to capture audio data, and a display device 132 and speaker device 134 for reproducing the content items 120(1)-(n). In some aspects, the SMN application 126 may be a local client that facilitates user interaction with the SMN 102 by sending requests 136 and receiving responses 138. For instance, a request 136 may include, but is not limited to, a service request and/or an application programming interface (API) call. Also, for instance, a response 138 may include, but is not limited to, a service response and/or an API response. For example, a request 136 may be a request to post a content item to the SMN 102, and the response 138 may be a notification indicating that the content item was posted to the SMN 102. As another example, a request 136 may be a request for a feed and/or messages of a user account 118, and a response 128 may be the feed and/or the messages of the user account 118. Some examples of the SMN application 126 include native mobile applications, hybrid mobile, applications, desktop applications, and so forth. For example, a user account 118 may create, delete, edit, and/or view the content collections 122 via user input received by the SMN application 126 and provided to the collection management module 114. Further, a user account 118 may create, delete, edit, and/or view the content items 120 via the SMN application 126. For example, a user may create content items 120 using the video capture device 128 and the audio capture device 130, and send the content items 120 to the social media network 102 using the SMN application 126. In addition, the SMN application 126 may present a user feed generated by the feed module 108 and/or the messages managed by the messaging module 110. Further, as described herein, the feed and/or the messages may include the content collections 122(1)-(n). In particular, a thumbnail corresponding to a content collection 122 may be presented within a feed and/or message, and selectable within a feed and/or a message to initiate continuous playback of the content items 120 of the content collection 122.

FIG. 2A illustrates example graphical user interfaces for adding a content item to a content collection, in accordance with some aspects of the present disclosure. As illustrated in FIG. 2A, the SMN application 126 may present a GUI 200 including a content item 202 in a presentation mode/playback mode and a first GUI control 204 (e.g., a button) for adding the content item 202 to a content collection. In some aspects, the user may select the GUI control 204 in order to save the content item 202 for later viewing. In response to selection of the GUI control 204, the SMN application 126 may present a GUI 206 including a first GUI control 208 for creating a new content collection including the content item 202 and a second GUI control 210 representing an existing content collection, e.g., such as a thumbnail representation of an existing content collection 122. Upon selection of the first GUI control 208, the SMN application 126 may send a request 136 to the SMN 102 that causes the collection management module 114 to create a content collection 122 including the content item 202. Further, upon selection of the second GUI control 210, the SMN application 126 may send a request 136 to the SMN 102 that causes the collection management module 114 to add the content item 202 to the existing content collection. Although FIG. 2A shows one GUI control corresponding to an existing content collection, the GUI 206 may include more than one GUI control each corresponding to an existing content collection.

FIG. 2B illustrates an example graphical user interface for viewing a collection representation, in accordance with some aspects of the present disclosure. As illustrated in FIG. 2B, the SMN application 126 may present a GUI 211 that presents a collection management interface 212 for a given user account 118 that is used to configure access by one or more other user accounts to one or more of the content collections 122 of the user account 118. In some aspects, the collection management interface 212 may be presented to a user account 118 having a permission for setting the user accounts that are permitted to access a content collection. Further, the collection management interface 212 may be configured to receive a selection and deselection of a user account 118. For example, the collection management interface 212 may include a text field 213 for receiving an identifier of a user account 118. Upon selection of a user account, the SMN application 126 may send a request 136 to the SMN 102 that causes the collection management module 114 to provide access rights (e.g., viewing rights) to the selected user account 118.

FIG. 2C illustrates an example graphical user interface for managing a content collection, in accordance with some aspects of the present disclosure. As illustrated in FIG. 2C, the SMN application 126 may present a GUI 214 that presents a content collection management interface 216, and presents collection thumbnail representations 218(1)-(n) for the content items 120 of the content collection 122 of a given user account 118. The content collection management interface 216 may present the collection thumbnail representation 219(1) of each the content collection 122 of the given user account 118, one or more attributes of the content collection 122 (e.g., the number of content items in the content collection), a GUI control 219(2) for modifying the visibility of the content collection 122 (e.g., private, group, or public), and/or a GUI control 219(3) for sharing the content collection 122 with user accounts 118 and/or generating a content file from the content collection 122. Further, in some aspects, the collection thumbnail representations 218 may be selectable for playback/reproduction of the corresponding content item 120. In addition, in some aspects, a collection thumbnail representations 218 may include group access information 220 identifying an interaction by a user account 118 with the content item 120 within the content collection 122. For example, the group access information 220 may identify the user account 118 that added the content item 120 to the content collection 122. In some aspects, the GUI 214 may be presented to a user account 118 in response to the user account 118 navigating to an address associated with the content collection 122 via the SMN application 126.

FIG. 2D illustrates example graphical user interfaces for creating a collection representation of a content collection, in accordance with some aspects of the present disclosure. As illustrated in FIG. 2D, the SMN application 126 may present a GUI 222 for design a collection representation for a content collection 122. The GUI 222 may present a first design interface 224 for providing a title of the content collection 122 and one or more design elements for the title of the collection representation. For example, the first design interface 224 may display a plurality of titles 226(1)-(n) each having different design details based on the design elements. The GUI 222 may present a second design interface 228 for designing a personalized pictorial representation (e.g., emoji) for the collection representation. For example, the second design interface may display different personalized pictorial representations 230(1)-(n) with different design details. The GUI 222 may present a third design interface 232 for selecting a background image for the collection representation. For example, the third design interface 233 may display a plurality of different background images 234(1)-(n). Once the design elements for the collection representation have been selected, the collection representation generation module 116 may generate a collection thumbnail representation 236 for the content collection 122 based on the selections made via the first design interface 224, the second design interface 228, and the third design interface 232. As illustrated in GUI 238, the collection thumbnail representation 236 may be used within the SMN application 126 to represent the corresponding content collection 122. For example, the collection thumbnail representation 236 may be presented within a messaging process or feed process of the SMN application 126. Further, in some aspects, if the collection thumbnail representation 236 is selected within the SMN application 126, the SMN application 126 may reproduce the content items 120 of the content collection 122 in a continuous playback mode.

Example Processes

FIG. 3 is a flow diagram illustrating an example method 300 for managing a social media content collection (SMCC), in accordance with some aspects of the present disclosure. Moreover, the method 300 may be executed by the computer device 400 of FIG. 4.

The process described in FIG. 3 below is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the SMN 102 and/or the user device 104 executing the SMN application 126. By way of example and not limitation, the method 300 is described in the context of FIGS. 1-2 and 4. For example, the operations may be performed by one or more of the SMN 102, the feed module 108, the messaging module 110, the profile module 112, the collection management module 114, the collection representation generation module 116, and/or the user device 104 executing the SMN application 126.

At block 302, the method 300 may include generating a social media content collection (SMCC) within a social media network. For example, the collection management module 114 may create the content collection 122 (i.e., the SMCC) in response to a request associated with user account 118(1). Accordingly, SMN 102, the computing device 400, and/or the processor 401 executing the collection management module 114 may provide means for generating a social media content collection (SMCC) within a social media network.

At block 304, the method 300 may include assigning an administrator privilege for the SMCC to an account on the social media network, the administrator privilege granting the account one or more access rights. For example, the collection management module 114 may grant administrator privileges to the user account 118(1) that created the content collection 122.

Accordingly, the SMN 102, the computing device 400, and/or the processor 401 executing the collection management module 114 may provide means for assigning an administrator privilege for the SMCC to an account on the social media network, the administrator privilege granting the account one or more access rights.

At block 306, the method 300 may include generating a collection representation via a graphical user interface (GUI) wizard on the social media network. For example, the user account 118(1) may generate a collection representation via the collection representation generation module 116.

Accordingly, the SMN 102, the computing device 400, and/or the processor 401 executing the collection representation generation module 116 may provide means for generating a collection representation via a graphical user interface (GUI) wizard on the social media network.

At block 308, the method 300 may include setting the collection representation as a collection thumbnail representation of the SMCC on the social media network. For example, the collection management module 114 or the collection representation generation module 116 may set the collection thumbnail for the content collection 122 to the collection representation.

Accordingly, the SMN 102, the computing device 400, and/or the processor 401 executing the collection management module 114 may provide means for setting the collection representation as a collection thumbnail representation of the SMCC on the social media network.

At block 310, the method 300 may include adding, based on the one or more access rights, one or more video content items to the SMCC, in response to selection of a GUI control in a presentation mode of the one or more content items. For example, the user account 118(1) may add the content item 120(1) to the content collection 122.

Accordingly, the SMN 102, the computing device 400, and/or the processor 401 executing the collection management module 114 may provide means for adding, based on the one or more access rights, one or more video content items to the SMCC, in response to selection of a GUI control in a presentation mode of the one or more content items.

At block 312, the method 300 may reproducing, in response to selection of the SMCC, the one or more video content items in a continuous playback mode. For example, a user account may view the collection 122. Further, in some aspects, each of the content item 120 may playback continuously.

Accordingly, the SMN 102, the computing device 400, and/or the processor 401 executing the collection management module 114, the feed module 108, the messaging module 110, and/or the profile module 112 may provide means for reproducing, in response to selection of the SMCC, the one or more video content items in a continuous playback mode.

Additionally, or alternatively, the method 300 may include reproducing the one or more video content items in the continuous playback mode comprises reproducing the one or more video content items in response to selection of a GUI control displayed over the collection thumbnail.

Additionally, or alternatively, the SMCC has an address within the social media network, and the method 300 may include presenting a content thumbnail representation for each of the one or more video content items in response to navigation to the address via the social media network.

Additionally, or alternatively, the account is a first account and the one or more access rights are one or more first access rights, and the method 300 may include receiving, from the first account, selection of the second account via the social media network; granting, in response to the selection, a second account one or more second access rights; and accessing, by the second account, the SMCC based on the one or more second access rights, wherein the accessing includes at least one of adding a first video content item to the SMCC, removing a second video content item from the SMCC, editing one or more attributes of the SMCC, and/or viewing the one or more video content items in a continuous playback mode.

Additionally, or alternatively, the method 300 may include configuring, based on the one or more access rights, the viewing setting of the content collection to private, group, or public.

Additionally, or alternatively, the method 300 may include wherein generating the collection representation comprises receiving selection of one or more design elements via the GUI wizard, wherein the design elements include textual information, a foreground image, a background image, and/or an animation.

Additionally, or alternatively, the method 300 may include combining the one or more content items to generate a single SMCC content file.

Additionally, or alternatively, the method 300 may include presenting the SMCC within a content feed of the social media network.

Additionally, or alternatively, the account is a first account and the method 300 may include sending, by the first account, the SMCC to a second account via a messaging platform, wherein the SMCC is represented by the collection thumbnail representation within a messaging content of the social media application.

Additionally, or alternatively, the method 300 may include sending, by the first account, the SMCC to a second account via a messaging platform, wherein the SMCC is represented by the collection thumbnail representation within a messaging content of the social media application.

Additionally, or alternatively, the account may be a first account, and the method 300 may include displaying a content item of the one or more video content items with group access information in response to navigation to an address corresponding to the SMCC via the social media network, the group access information identifying that a second account interacted with the content item.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 4:
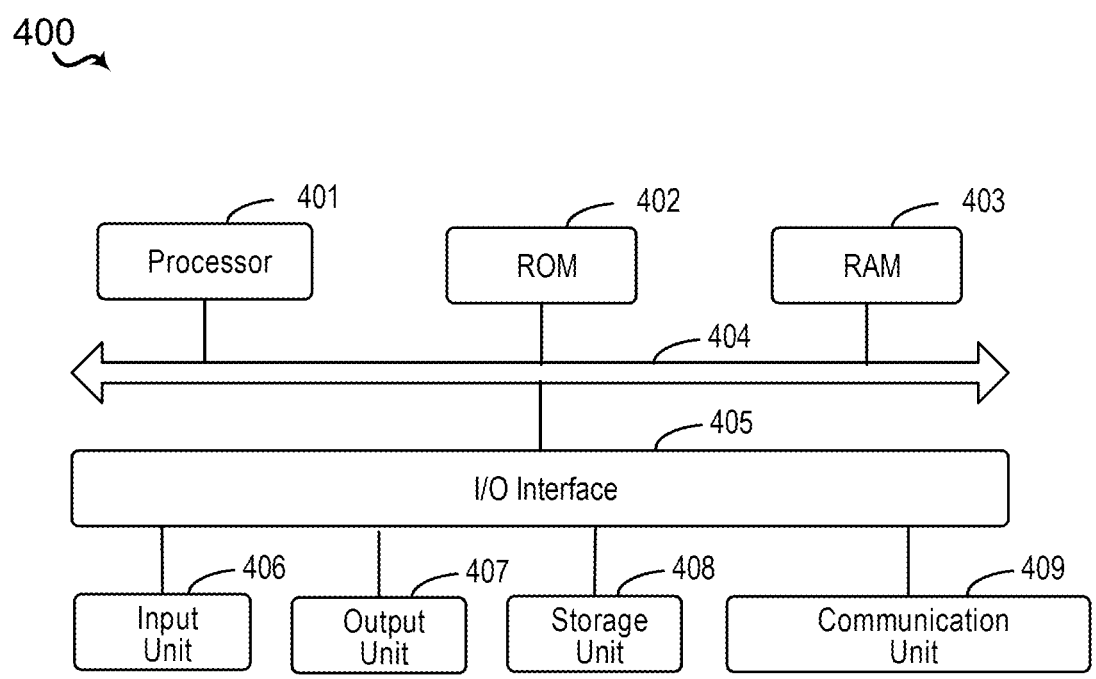
FIG. 4 is a block diagram illustrating an example of a hardware implementation for a computing device(s), in accordance with some aspects of the present disclosure.

FIG. 4 illustrates a block diagram of an example computing system/device 400 (e.g., the SMN 102, the user devices 104(1)-(n)) suitable for implementing example embodiments of the present disclosure. The system/device 400 may be a specially programmed computer, physical computing device, or portable electronic device, and/or may be practiced in distributed cloud computing environments where tasks are performed by remote processing devices that are linked through a communication network. The system/device 400 can be used to implement any of the processes described herein.

As depicted, the system/device 400 includes a processor 401 which is capable of performing various processes according to a program stored in a read only memory (ROM) 402 or a program loaded from a storage unit 408 to a random-access memory (RAM) 403. In the RAM 403, data required when the processor 401 performs the various processes or the like is also stored as required. The processor 401, the ROM 402 and the RAM 403 are connected to one another via a bus 404. An input/output (I/O) interface 405 is also connected to the bus 404.

The processor 401 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 400 may have multiple processors, such as an application-specific integrated circuit chip that is slaved in time to a clock which synchronizes the main processor.

A plurality of components in the system/device 400 are connected to the I/O interface 405, including an input unit 406, such as a keyboard, a mouse, microphone) or the like; an output unit 407 including a display such as a cathode ray tube (CRT), a liquid crystal display (LCD), or the like, and a speaker or the like; the storage unit 408, such as disk and optical disk, and the like; and a communication unit 409, such as a network card, a modem, a wireless transceiver, or the like. The communication unit 409 allows the system/device 400 to exchange information/data with other devices via a communication network, such as the Internet, various telecommunication networks, and/or the like.

The methods and processes described above, such as the method 300, can also be performed by the processor 401. In some embodiments, the method 300 can be implemented as a computer software program or a computer program product tangibly included in the computer readable medium, e.g., storage unit 408. In some embodiments, the computer program can be partially or fully loaded and/or embodied to the system/device 400 via ROM 402 and/or communication unit 409. The computer program includes computer executable instructions that are executed by the associated processor 401. When the computer program is loaded to RAM 403 and executed by the processor 401, one or more acts of the method 300 described above can be implemented. Alternatively, processor 401 can be configured via any other suitable manners (e.g., by means of firmware) to execute the method 300 in other embodiments.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:
   generating a social media content collection (SMCC) within a social media network;
   assigning an administrator privilege for the SMCC to an account on the social media network, the administrator privilege granting the account one or more access rights;
   receiving a selection of two or more design elements via a graphical user interface (GUI) wizard, wherein the design elements include textual information, a foreground image, a background image, and/or an animation;
   generating a collection representation via the GUI wizard on the social media network based on the two or more design elements;
   setting the collection representation as a collection thumbnail representation of the SMCC on the social media network;
   adding, based on the one or more access rights, one or more video content items to the SMCC, in response to selection of a GUI control in a presentation mode of the one or more video content items; and
   reproducing, in response to selection of the SMCC, the one or more video content items in a continuous playback mode.

2. The method of claim 1, wherein reproducing the one or more video content items in the continuous playback mode comprises:
   reproducing the one or more video content items in response to selection of a GUI control displayed over the collection thumbnail representation.

3. The method of claim 1, wherein the SMCC has an address within the social media network, and further comprising:
   presenting a content thumbnail representation for each of the one or more video content items in response to navigation to the address via the social media network.

4. The method of claim 1, wherein the account is a first account and the one or more access rights are one or more first access rights, and further comprising:
   receiving, from the first account, selection of a second account via the social media network;
   granting, in response to the selection, a second account one or more second access rights; and
   accessing, by the second account, the SMCC based on the one or more second access rights, wherein the accessing includes at least one of adding a first video content item to the SMCC, removing a second video content item from the SMCC, editing one or more attributes of the SMCC, and/or viewing the one or more video content items in the continuous playback mode.

5. The method of claim 1, further comprising configuring, based on the one or more access rights, a viewing setting of the SMCC to private access, group access, or public access.

6. The method of claim 1, further comprising combining the one or more video content items to generate a single SMCC content file.

7. The method of claim 1, further comprising presenting the SMCC within a content feed of the social media network.

8. The method of claim 1, wherein the account is a first account, and further comprising:
   sending, by the first account, the SMCC to a second account via a messaging platform, wherein the SMCC is represented by the collection thumbnail representation within messaging content of a social media application.

9. The method of claim 1, wherein the account is a first account, and further comprising:
   displaying a content item of the one or more video content items with group access information in response to navigation to an address corresponding to the SMCC via the social media network, the group access information identifying that a second account interacted with the content item.

10. A non-transitory computer-readable device having instructions thereon that, when executed by at least one computing device, causes the at least one computing device to perform operations comprising:
    generating a social media content collection (SMCC) within a social media network;
    assigning an administrator privilege for the SMCC to an account on the social media network, the administrator privilege granting the account one or more access rights;
    receiving a selection of two or more design elements via a graphical user interface (GUI) wizard, wherein the design elements include textual information, a foreground image, a background image, and/or an animation;
    generating a collection representation via the GUI wizard on the social media network based on the two or more design elements;
    setting the collection representation as a collection thumbnail representation of the SMCC on the social media network;
    adding, based on the one or more access rights, one or more video content items to the SMCC, in response to selection of a GUI control in a presentation mode of the one or more video content items; and
    reproducing, in response to selection of the SMCC, the one or more video content items in a continuous playback mode.

11. The non-transitory computer-readable device of claim 10, wherein the social media content collection has an address within the social media network, and the instructions cause the at least one computing device to perform operations further comprising:

presenting a content thumbnail representation for each of the one or more video content items in response to navigation to the address via the social media network.

12. The non-transitory computer-readable device of claim 10, wherein the account is a first account and the one or more access rights are one or more first access rights, and the instructions cause the at least one computing device to perform operations further comprising:
receiving, from the first account, selection of a second account via the social media network;
granting, in response to the selection of the second account, one or more second access rights; and
accessing, by the second account, the SMCC based on the one or more second access rights, wherein the accessing includes at least one of adding a first video content item to the SMCC, removing a second video content item from the SMCC, editing one or more attributes of the SMCC, and/or viewing the one or more video content items in the continuous playback mode.

13. The non-transitory computer-readable device of claim 10, wherein the instructions cause the at least one computing device to perform operations further comprising combining the one or more video content items to generate a single SMCC content file.

14. The non-transitory computer-readable device of claim 10, wherein the instructions cause the at least one computing device to perform operations further comprising presenting the SMCC within a content feed of the social media network.

15. The non-transitory computer-readable device of claim 10, wherein the account is a first account, and the instructions cause the at least one computing device to perform operations further comprising sending, by the first account, the SMCC to a second account via a messaging platform, wherein the SMCC is represented by the collection thumbnail representation within messaging content of a social media application.

16. A system comprising:
a memory storing instructions thereon; and
at least one processor coupled with the memory and configured by the instructions to:
generate a social media content collection (SMCC) within a social media network;
assign an administrator privilege for the SMCC to an account on the social media network, the administrator privilege granting the account one or more access rights;
receive a selection of two or more design elements via a graphical user interface (GUI) wizard, wherein the design elements include textual information, a foreground image, a background image, and/or an animation;
generate a collection representation via the GUI wizard on the social media network based on the two or more design elements;
set the collection representation as a collection thumbnail representation of the SMCC on the social media network;
add, based on the one or more access rights, one or more video content items to the SMCC, in response to selection of a GUI control in a presentation mode of the one or more video content items; and
reproduce, in response to selection of the SMCC, the one or more video content items in a continuous playback mode.

17. The system of claim 16, wherein to reproduce the one or more video content items in the continuous playback mode, and the at least one processor is further configured by the instructions to:
reproduce the one or more video content items in response to the selection of the GUI control displayed over the collection thumbnail representation.

18. The system of claim 16, wherein the SMCC has an address within the social media network and the at least one processor is further configured by the instructions to:
present a content thumbnail representation for each of the one or more video content items in response to navigation to the address via the social media network.

19. The system of claim 16, wherein the account is a first account and the one or more access rights are one or more first access rights, and the at least one processor is further configured by the instructions to:
receive, from the first account, selection of a second account via the social media network;
grant, in response to the selection of the second account one or more second access rights; and
access, by the second account, the SMCC based on the one or more second access rights, wherein the accessing includes at least one of adding a first video content item to the SMCC, removing a second video content item from the SMCC, editing one or more attributes of the SMCC, and/or viewing the one or more video content items in the continuous playback mode.

20. The system of claim 16, wherein the at least one processor is further configured by the instructions to configure, based on the one or more access rights, a viewing setting of the SMCC to private access, group access, or public access.

21. The system of claim 16, wherein the at least one processor is further configured by the instructions to combine the one or more video content items to generate a single SMCC content file.

22. The system of claim 16, wherein the at least one processor is further configured by the instructions to present the SMCC within a content feed of the social media network.

23. The system of claim 16, wherein the account is a first account, and the at least one processor is further configured by the instructions to:
send, by the first account, the SMCC to a second account via a messaging platform, wherein the SMCC is represented by the collection thumbnail representation within messaging content of a social media application.

24. The system of claim 16, wherein the account is a first account, and the at least one processor is further configured by the instructions to:
display a content item of the one or more video content items with group access information in response to navigation to an address corresponding to the SMCC via the social media network, the group access information identifying that a second account interacted with the content item.

25. The method of claim 1, wherein generating the SMCC within the social media network includes creating a collection of content items for presentation within a presentation GUI based on personalized user information collected about a corresponding user account.

26. The method of claim 1, wherein generating the collection representation further includes adding a personalized pictorial representation with virtual clothes and animation effects based on a user input to the GUI wizard.

* * * * *